（12） United States Patent
Wu

(10) Patent No.: US 11,376,649 B2
(45) Date of Patent: Jul. 5, 2022

(54) METHOD FOR PREPARING EVAPORATOR FOR REDUCING WATER CONDENSING CAPACITY AND EVAPORATOR

(71) Applicant: Wuyi University, Jiangmen (CN)

(72) Inventor: Min Wu, Jiangmen (CN)

(73) Assignee: Wuyi University, Jiangmen (CN)

( * ) Notice: Subject to any disclaimer, the term of this patent is extended or adjusted under 35 U.S.C. 154(b) by 91 days.

(21) Appl. No.: 16/832,536

(22) Filed: Mar. 27, 2020

(65) Prior Publication Data

US 2021/0247116 A1   Aug. 12, 2021

(30) Foreign Application Priority Data

Feb. 11, 2020 (CN) .......................... 202010087205.3

(51) Int. Cl.
*B21D 53/02* (2006.01)
*F25B 47/00* (2006.01)
*B23P 15/26* (2006.01)

(52) U.S. Cl.
CPC ............ *B21D 53/02* (2013.01); *F25B 47/006* (2013.01); *B23P 15/26* (2013.01); *F28F 2255/00* (2013.01); *F28F 2255/10* (2013.01); *F28F 2255/12* (2013.01); *F28F 2275/12* (2013.01); *F28F 2275/125* (2013.01); *Y10T 29/4935* (2015.01); *Y10T 29/49396* (2015.01)

(58) Field of Classification Search
CPC ........ F25B 47/006; F25B 39/02; B21D 53/02; B21D 53/08; B21D 39/06; B21D 39/08; B23P 15/26; F28F 2255/00; F28F 2255/10; F28F 2255/12; F28F 2275/12; F28F 2275/125; Y10T 29/4935; Y10T 29/49396
See application file for complete search history.

(56) References Cited

U.S. PATENT DOCUMENTS

| 2013/0306295 A1* | 11/2013 | Pierce | B21D 53/02 165/185 |
| 2014/0020880 A1* | 1/2014 | Fanberg | F28F 1/30 165/185 |
| 2020/0232721 A1* | 7/2020 | He | F28F 1/30 |
| 2021/0389058 A1* | 12/2021 | Iwasaki | F28F 1/32 |

* cited by examiner

*Primary Examiner* — Moshe Wilensky
(74) *Attorney, Agent, or Firm* — Vivacque Crane PLLC

(57) ABSTRACT

The present invention discloses a method for preparing an evaporator for reducing water condensing capacity and an evaporator. The preparation method comprises steps of: step A: selecting fins; step B: stacking; step C: arranging tubes; and, step D: expanding tubes. In accordance with the present invention, the existing fins and devices can be used to produce an evaporator in which the distance between two adjacent fins satisfies the requirements of the freezing operation, ensuring the normal operation of an air conditioner when the refrigeration temperature is below 0° C.

8 Claims, 6 Drawing Sheets

METHOD FOR PREPARING EVAPORATOR FOR REDUCING WATER CONDENSING CAPACITY AND EVAPORATOR

CROSS-REFERENCE TO RELATED APPLICATIONS

This application claims priority to CN application number 202010087205.3, entitled "method for preparing evaporator for reducing water condensing capacity and evaporator" filed Feb. 11, 2020, the entirety of which is incorporated by reference herein.

TECHNICAL FIELD

The present invention relates to the technical field of refrigeration devices, and in particular to a method for preparing an evaporator for reducing water condensing capacity and an evaporator.

BACKGROUND

The working principle of the air conditioner is that the compressor compresses the gaseous refrigerant into a high-temperature and high-pressure gaseous refrigerant and delivers it to the condenser of the outdoor unit to form a liquid refrigerant; the liquid refrigerant enters the evaporator through the capillary tube to absorb heat in indoor air and vaporizes into a gaseous refrigerant; and then the gaseous refrigerant returns to the compressor for further compression and circulation so as to realize refrigeration.

At present, the air conditioner can realize a freezing function after improvement. That is, the lowest refrigeration temperature can reach below 0° C. Air blown by the fan in the air conditioner exchanges heat with the refrigerant in the evaporator to realize temperature reduction, and is blown into the room to realize refrigeration. During the refrigeration process, since the temperature in the indoor unit of the air conditioner is below 0° C., water vapor will be condensed and eventually blocks the evaporator tube, so that the air conditioner cannot operate normally. To reduce the condensing capacity of water vapor, it is necessary to increase the distance between fins of the evaporator. However, the distance between adjacent fins of fin-type evaporators available in the market is 3 mm and is unadjustable, so that the distance required by the freezing operation cannot be realized. If mold-making is performed to produce new fins, higher production cost will be incurred.

SUMMARY

The present invention is aimed at solving at least one of the above technical problems in the related art to a certain extent. Hence, the present invention provides a method for preparing an evaporator for reducing condensing capacity and an evaporator, which can use existing fins and existing devices to produce an evaporator in which the distance between two adjacent fins satisfies the requirements of the freezing operation, reduces the amount of water condensed on the evaporator during the refrigeration process, and ensures the normal operation of an air conditioner when the refrigeration temperature is below 0° C.

In accordance with an embodiment in a first aspect of the present invention, a method for preparing an evaporator for reducing water condensing capacity is provided, including steps of: step A: selecting fins: according to the size of the evaporator, selecting a corresponding number of fins, stamping bumps on each of the fins, and forming first through holes in the bumps; step B: stacking: aligning and successively stacking the multiple fins, with detachable backing plates provided between two adjacent fins, making one ends of the backing plates abut against the bumps and the other ends of the backing plates abut against ends of the fins away from the bumps, and forming second through holes on the backing plates at positions corresponding to the first through holes; step C: arranging tubes: selecting copper tubes same in number as the number of the first through holes on a single fin, and making the copper tubes pass through the first through holes and the second through holes to pass through the fins; and, step D: expanding tubes: sealing one end of each of the copper tubes, conveying a liquid medium having a pressure of 6 to 10 MPa into the copper tube from the other end of the copper tube by a medium conveying device, and maintaining the pressure for 20 to 100 s after the pressure in the copper tubes reaches a set range, so that the copper tubes are expanded in outer diameter to be in interference fit with the first through holes.

The method for preparing an evaporator for reducing water condensing capacity according to the embodiments of the present invention has at least the following technical effects. Multiple fins commonly available in the market are selected, bumps are stamped on the fins through flanging, and detachable backing plates are provided between two adjacent fins in the process of stacking the multiple fins. Then, multiple copper tubes are made to successively pass through the multiple fins in a left-right direction, and a liquid medium having a pressure of 6 to 10 MPa is conveyed into all the copper tubes by a medium conveying device. After the pressure in the copper tubes reaches a set range, the pressure is maintained for a period of time, so that the copper tubes are expanded in outer diameter to be in interference fit with the first through holes, and the copper tubes connect the multiple fins to form an evaporator. Due to the separation effect of the backing plates and the bumps, the distance between two adjacent fins on the evaporator is increased, so that the surface coefficient of heat transfer of the evaporator is increased, the speed of heat convection between air and the refrigerant in the evaporator is thereby quickened, the time of contact of water vapor in air with the evaporator is reduced, and the condensing capacity of water on the evaporator is reduced. Accordingly, the evaporator can still operate normally when the refrigeration temperature is below 0° C., and the requirements of the freezing operation are satisfied. Moreover, the bumps can increase the contact area of a single fin with the copper tubes, so that the copper tubes can be stably connected to the single fin after being expanded. Since the backing plates are detachable, after the evaporator in which the distance between two adjacent fins satisfies the requirements of the freezing operation is produced by the existing fins and the existing devices with the aid of the backing plates, the backing plates can be detached from the evaporator and used as auxiliary molds to prepare a next evaporator. With the aid of the backing plates, the evaporator satisfying the requirements of the freezing operation can be produced by the existing fins and the existing devices, and it is unnecessary to perform mold-making and purchase new production devices, so that the production cost is greatly reduced.

In accordance with some embodiments of the present invention, in the step B, each of the backing plates includes a first plate and a second plate which are separately arranged; a first semicircular groove is formed in the first plate, and a second semicircular groove is formed in the second plate at a position corresponding to the first semicircular groove; and, during mounting, the first semicircular groove and the second semicircular groove form the second through hole.

In accordance with some embodiments of the present invention, in the step B, a buckling column is convexly provided on an upper sidewall of the first plate, and a buckling recess matched with the buckling column is provided on a lower sidewall of the second plate.

In accordance with some embodiments of the present invention, in the step B, an inclined elastic member is arranged on a sidewall of an upper end of the buckling column; an end of the elastic member is connected to an outer sidewall of the buckling column; a suspended end of the elastic member is arranged away from the outer sidewall of the buckling column; the buckling recess is formed as a T-shaped groove; an end of the T-shaped groove away from the buckling column is a large-diameter groove, while the other end thereof is a small-diameter groove; and, during mounting, an end portion of the suspended end abuts against the wall of the large-diameter groove.

In accordance with some embodiments of the present invention, in the step B, the small-diameter groove has an opening at its lower end which is formed as an arc-shaped opening, so that the buckling column is embedded and clamped in the buckling recess at any angle.

In accordance with some embodiments of the present invention, in the step B, threaded through holes are formed in the first plate and the second plate in an up-down direction, respectively, and the threaded through holes are in threaded connection to the fastening screws.

In accordance with some embodiments of the present invention, in the step B, the multiple bumps are convexly arranged on an end face of each of the fins in a five-horizontal and four-vertical manner; two backing plates are arranged between two adjacent fins, with one of the backing plates abutting against the bumps in a same row at the uppermost end of each of the fins, and the other one of the backing plates abutting against the bumps in a same row at the lowermost end of each of the fins; and, four second through holes are formed in each of the backing plates in a front-rear direction.

In some embodiments of the present invention, in the step D, water having a pressure of 8 MPa is conveyed into the copper tubes by the medium conveying device; and, the pressure is maintained for 60 s after the pressure in the copper tubes reach the set range, so that the copper tubes are expanded in outer diameter to be in interference fit with the first through holes.

In accordance with an embodiment in a second aspect of the present invention, an evaporator is provided, which is prepared by any one of the preparation methods described above, wherein the evaporator includes multiple fins; multiple bumps are stamped on each of the fins; first through holes are formed on each of the fins at positions corresponding to the bumps; copper tubes pass through the first through holes; the copper tubes are in interference fit with the first through holes, and the copper tubes connect the multiple fins into a whole; and, the distance between the bumps of one of the fins and an adjacent one of the fins is 3 mm to 5 mm.

The evaporator according to the embodiments of the present invention has at least the following technical effects. By making the copper tubes be in interference fit with the first through holes, the copper tubes connect multiple fins to form an evaporator. By stamping bumps on each of the fins and making first through holes pass through the bumps, the bumps increase the contact area of a single fin with the copper tubes, and the copper tubes can be stably connected to the single fin, so that the structural stability of the evaporator is improved. Moreover, the distance between the bumps on one of the fins and an adjacent one of the fins is set as 3 mm to 5 mm. Compared with the evaporators available in the market, the distance between two adjacent fins on the evaporator in the embodiments of the present invention is 3 mm to 5 mm larger than the distance between two adjacent fins on the evaporators in the market. Thus, the surface coefficient of heat transfer of the evaporator is increased, the speed of heat convection between air and the refrigerant in the evaporator is thereby quickened, the time of contact of water vapor in air and the evaporator is reduced, and the condensing capacity of water on the evaporator is reduced. Accordingly, the evaporator can still operate normally when the refrigeration temperature is below 0° C., and the requirements of the freezing operation are satisfied.

In accordance with some embodiments of the present invention, the bumps each have a length of 3 mm, and the distance between the bumps one of the fins and an adjacent one of the fins is 3 mm.

Additional aspects and advantages of the present invention will be partially appreciated and become apparent from the following description, or will be well learned from the practices of the present invention.

BRIEF DESCRIPTION OF THE DRAWINGS

The above and/or additional aspects and advantages of the present invention will become apparent and readily comprehensible from the following description of embodiments with reference to the accompanying drawings, in which.

REFERENCE NUMBER

Figure 1:
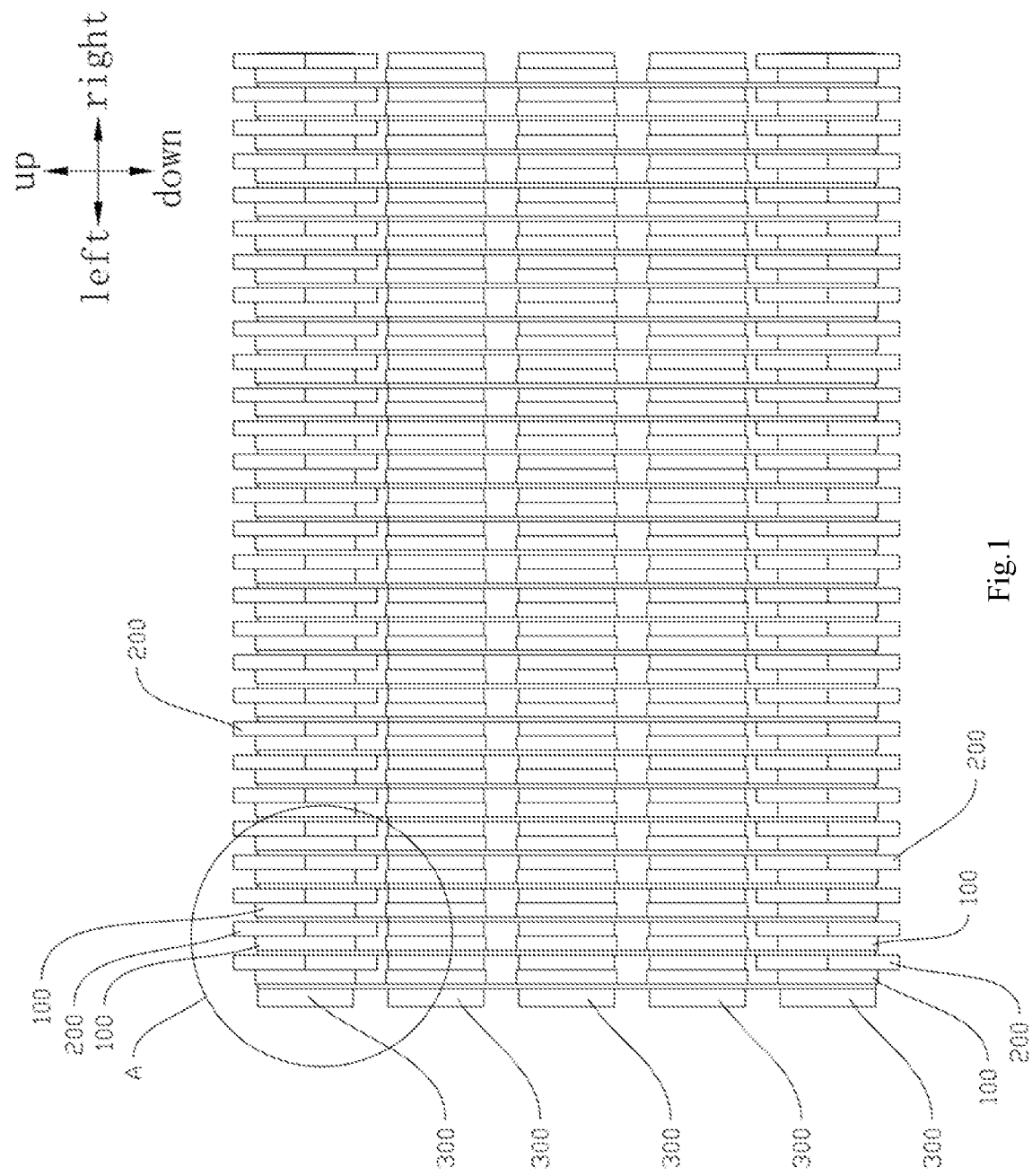
FIG. 1 is a schematic structure diagram according to an embodiment of the present invention.

100: fin; 110: bump; 120: first through hole;
200: backing plate; 210: second through hole; 211: first semicircular groove; 212: second semicircular groove; 220: first plate; 230: second plate; 240: buckling column; 241: elastic member; 250: buckling recess; 251: large-diameter groove; 252: small-diameter groove; 253: arc-shaped opening; and
300: copper tube.

DETAILED DESCRIPTION

Specific embodiments of the present invention will be described in detail in this section, and the preferred embodiments of the present invention are shown in the accompanying drawings. The accompanying drawings are used for supplementing the description of the text part of this specification in a graphic manner so that each technical feature and the overall technical solution of the present invention can be understood intuitively and visually. However, it should not be regarded as limiting the protection scope of the present invention.

In the description of the present invention, it should be understood that, in the description related to orientation, the orientation or position relation indicated by terms "upper", "lower", "front", "rear", "left", "right" or the like is an orientation or position relation shown by the accompanying drawings, merely for describing the present invention and simplifying the description rather than indicating or implying that the specified device or element must have a particular orientation or be constructed and operated in a particular orientation. Therefore, it should not be interpreted as limitations to the present invention.

In the description of the present invention, the terms "first" and "second" are merely used for distinguishing the technical features, rather than implying or indicating relative importance or implicitly indicating the number of the involved technical features or the precedence relationship between the involved technical features.

In the description of the present invention, unless otherwise explicitly defined, the terms "arrange", "mount", "connect" or the like shall be interpreted in a broad sense. The specific meanings of these terms in the present invention can be rationally determined in combination with the specific contents of the technical solutions by those skilled in the art.

With reference to FIGS. 1-4 and FIG. 6, in accordance with an embodiment of the present invention, a method for preparing an evaporator for reducing water condensing capacity is provided, including steps of: step A: selecting fins 100: according to the size of the evaporator, selecting a corresponding number of fins 100, stamping bumps 110 on each of the fins 100, and forming first through holes 120 in the bumps 110; step B: stacking: aligning and successively stacking the multiple fins 100, with detachable backing plates 200 provided between two adjacent fins 100, making one ends of the backing plates 200 abut against the bumps 110 and the other ends of the backing plates 200 abut against ends of the fins 100 away from the bumps 110, and forming second through holes 210 on the backing plates 200 at positions corresponding to the first through holes 120; step C: arranging tubes: selecting copper tubes 300 same in number as the number of the first through holes 120 on a single fin 100, and making the copper tubes 300 pass through the first through holes 120 and the second through holes 210 to pass through the fins 100; and, step D: expanding tubes: sealing one end of each of the copper tubes 300, conveying a liquid medium having a pressure of 6 to 10 MPa into the copper tube 300 from the other end of the copper tube 300 by a medium conveying device, and maintaining the pressure for 20 to 100 s after the pressure in the copper tubes 300 reaches a set range, so that the copper tubes 300 are expanded in outer diameter to be in interference fit with the first through holes 120.

Compared with the prior art, in the embodiment of the present invention, multiple fins 100 common in the market are selected, bumps 110 are stamped on the fins 100 through flanging, and detachable backing plates 200 are provided between two adjacent fins 100 in the process of stacking the multiple fins 100. Then, multiple copper tubes 300 successively pass through the multiple fins 100 in a left-right direction, and a liquid medium having a pressure of 6 to 10 MPa is conveyed into all the copper tubes 300 by a medium conveying device. After the pressure in the copper tubes 300 reaches a set range, the pressure is maintained for a period of time, so that the copper tubes 300 are expanded in outer diameter to be in interference fit with the first through holes 120, and the copper tubes 300 connect the multiple fins 100 to form an evaporator. Due to the separation effect of the backing plates 200 and the bumps 110, the distance between two adjacent fins 100 on the evaporator is increased, so that the surface coefficient of heat transfer of the evaporator is increased, the speed of heat convection between air and the refrigerant in the evaporator is thereby quickened, the time of contact of water vapor in air with the evaporator is reduced, and the condensing capacity of water on the evaporator is reduced. Accordingly, the evaporator can still operate normally when the refrigeration temperature is below 0° C., and the requirements of the freezing operation are satisfied. Moreover, the bumps 110 can increase the contact area of a single fin 100 with the copper tubes 300, so that the copper tubes 300 can be stably connected to the single fin 100 after being expanded. Since the backing plates 200 are detachable, after the evaporator in which the distance between two adjacent fins 200 satisfies the requirements of the freezing operation is produced by the existing fins 100 and the existing devices with the aid of the backing plates 200, the backing plates 200 can be detached from the evaporator, and used as auxiliary molds to prepare a next evaporator. With the aid of the backing plates 200, the evaporator satisfying the requirements of the freezing operation can be produced by the existing fins 100 and the existing devices, and it is unnecessary to perform mold-making and purchase new production devices, so that the production cost is greatly reduced.

Figure 3:
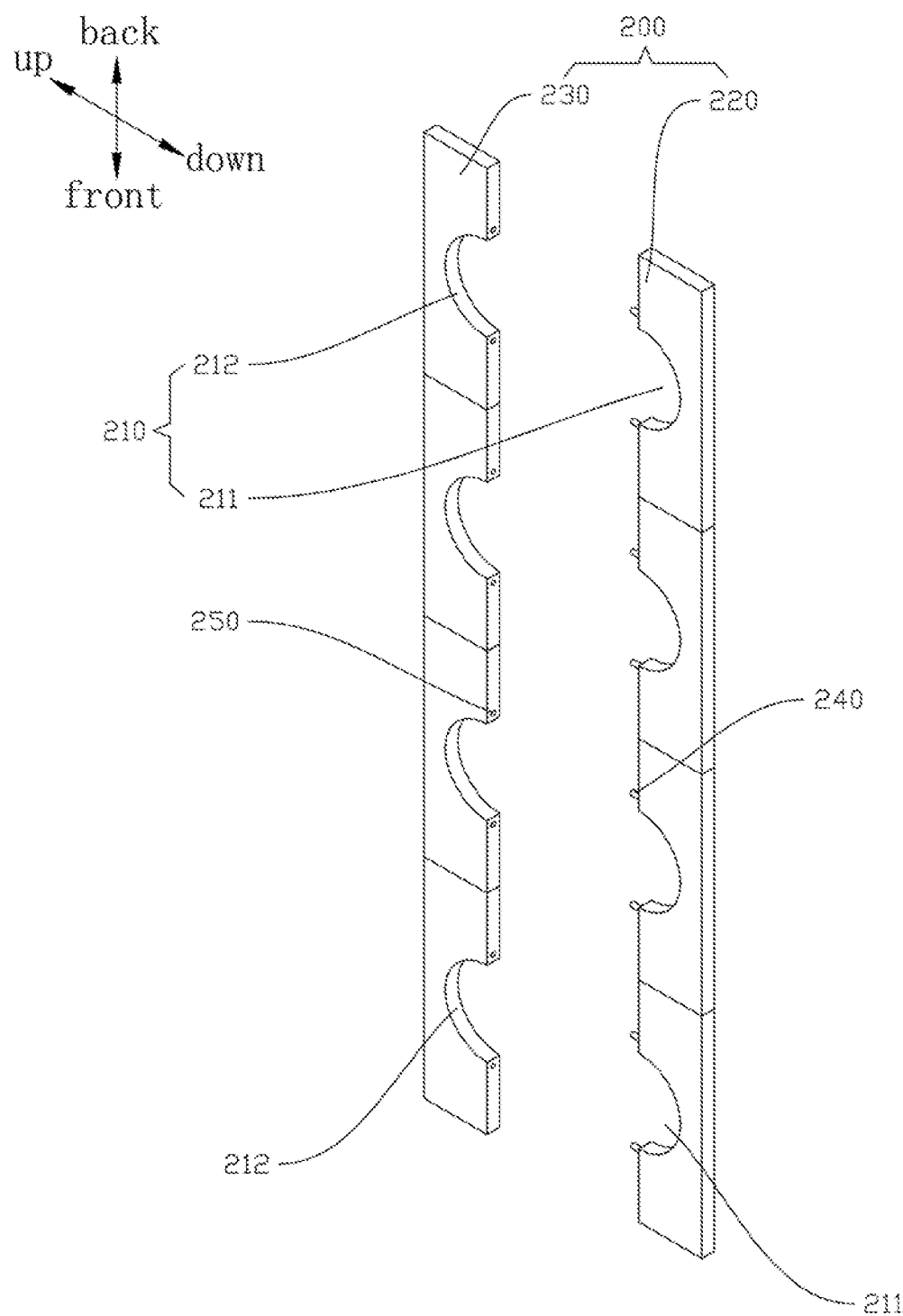
FIG. 3 is a stereoscopic structure diagram of backing plates according to an embodiment of the present invention.
Figure 4:
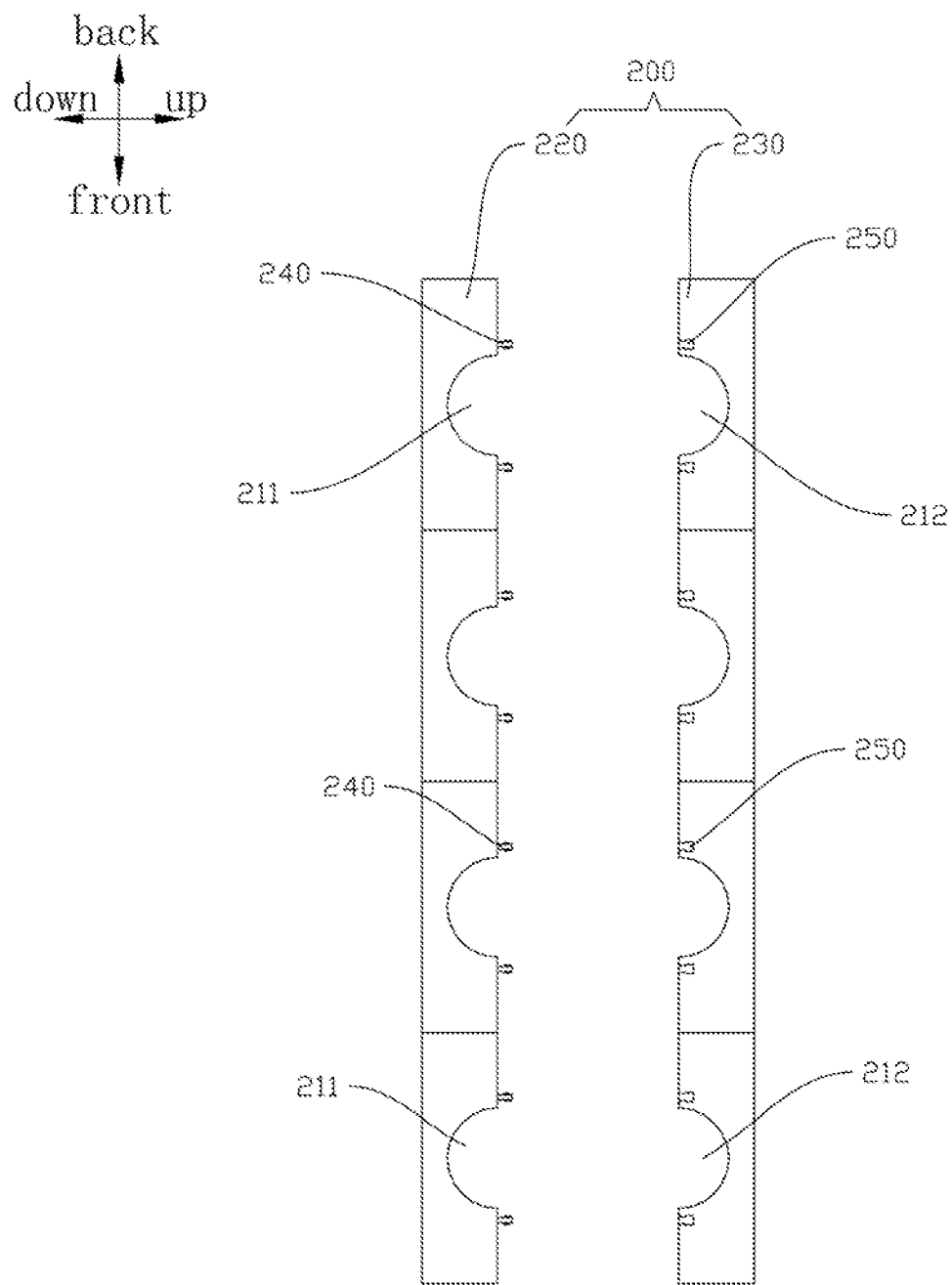
FIG. 4 is an exploded view of backing plates according to an embodiment of the present invention.

As shown in FIGS. 3 and 4, in some embodiments of the present invention, in the step B, each of the backing plates 200 includes a first plate 220 and a second plate 230 which are separately arranged; a first semicircular groove 211 is formed in the first plate 220, and a second semicircular groove 212 is formed on the second plate 230 at a position corresponding to the first semicircular groove 211; and, during mounting, the first semicircular groove 211 and the second semicircular groove 212 form the second through hole 210. In such an arrangement, during the preparation of the evaporator, the first plate 220 and the second plate 230 are connected integrally to form a backing plate 200, and the second through hole 210 formed by the first semicircular groove 211 and the second semicircular groove 212 allows the copper tubes 300 to pass therethrough, so that the copper tubes 300 connect all the fins 100. Moreover, the copper tubes 300 can be in interference fit with the first through hole 120 after the tube expansion process, so that the copper tubes 300 connect the multiple fins 100 into a whole to form an evaporator. Since the first plate 220 and the second plate 230 are detachable, after the evaporator in which the distance between two adjacent fins 100 satisfies the requirements of the freezing operation is prepared, the first plate 220 and the second plate 230 can be detached, and the first semicircular groove 211 and the second semicircular groove 212 are separated from each other, so that the backing plate 200 is detached from the evaporator.

As shown in FIGS. 3 and 4, further, in the step B, a buckling column 240 is convexly provided on an upper sidewall of the first plate 220, and a buckling recess 250 matched with the buckling column 240 is provided on a lower sidewall of the second plate 230. The first plate 220 and the second plate 230 are detachably connected in a buckling manner. During the preparation of the evaporator, by buckling the buckling column 240 on the buckling recess 250, the backing plate 200 is formed as a whole and arranged between two adjacent fins 100 to increase the distance therebetween, so that the distance between two adjacent fins 100 in the prepared evaporator satisfies the freezing requirements. After the evaporator is prepared, the buckling column 240 can be detached from the buckling recess 250, so that the first plate 220 and the second plate 230 are separated from each other, and the backing plate 200 is taken down from the evaporator and used as an auxiliary tool to prepare a next evaporator.

Figure 5:
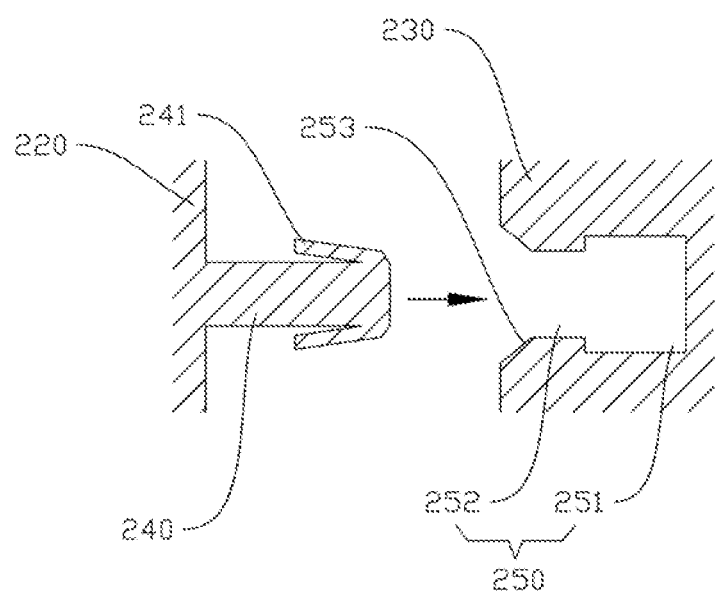
FIG. 5 is a schematic assembly diagram of a buckling column and a buckling recess according to an embodiment of the present invention.
Figure 6:
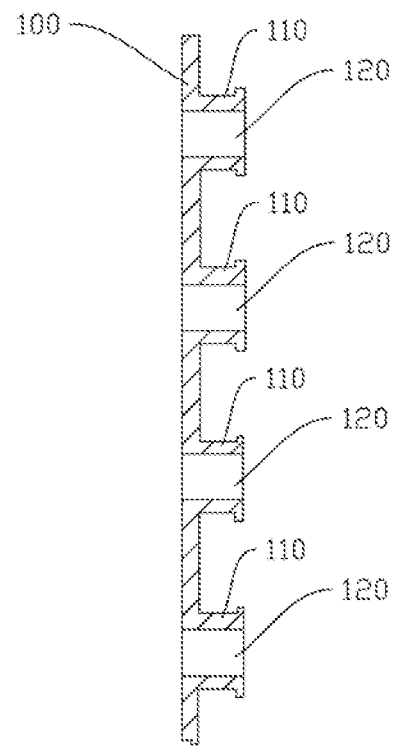
FIG. 6 is a partially schematic structure diagram of fins according to an embodiment of the present invention.

As shown in FIGS. 3 and 5, further, in the step B, an inclined elastic member 241 is arranged on a sidewall of an upper end of the buckling column 240; an end of the elastic member 241 is connected to an outer sidewall of the buckling column 240; a suspended end of the elastic member 241 is arranged away from the outer sidewall of the buckling column 240; the buckling recess 250 is formed as a T-shaped groove; an end of the T-shaped groove away from the buckling column 240 is a large-diameter groove 251, while the other end thereof is a small-diameter groove 252; and, during mounting, an end portion of the suspended end abuts against the wall of the large-diameter groove 251. By arranging the inclined elastic member 241 on the sidewall of the front end of the buckling column 240, in the process of buckling the buckling column 240 on the buckling recess 250, the suspended end of the elastic member 241 is continuously deformed toward the outer sidewall of the buckling column 240 so as to pass through the small-diameter groove 252 since the elastic member 241 is squeezed by the wall of the small-diameter groove 252. When the elastic member 242 completely passes through the small-diameter groove 252 and enters the large-diameter groove 251, the elastic member 241 is restored elastically due to the lack of the squeezing force of the wall of the small-diameter groove 252, and the end portion of the suspended end of the elastic member 241 abuts against the wall of the large-diameter groove 251 for buckling. The first plate 220 and the second plate 230 are connected stably, and will not be separated from each other when receiving the force applied to the first semicircular groove 211 and the second semicircular groove 212 in the expansion process of the copper tubes 300.

As shown in FIG. 5, further, in the step B, the small-diameter groove 252 has an opening at its lower end which is formed as an arc-shaped opening 253, so that the buckling column 240 is embedded and clamped in the buckling recess 250 at any angle.

In some embodiments of the present invention, in the step B, the multiple bumps 110 are convexly arranged on an end face of each of the fins 100 in a five-horizontal and four-vertical manner; two backing plates 200 are arranged between two adjacent fins 100, with one of the backing plates 200 abutting against the bumps 110 in a same row at the uppermost end of each of the fins 100, and the other one of the backing plates 200 abutting against the bumps 110 in a same row at the lowermost end of each of the fins 100; and, four second through holes 210 are formed in each of the backing plates 200 in a front-rear direction. In such an arrangement, simply by arranging two backing plates 200 between two adjacent fins 100, the distance between two adjacent fins 100 in the prepared evaporator can satisfy the requirements of the freezing operation. The number of the backing plates 200 used is reduced. Moreover, since the backing plates 200 are arranged in only two rows, two rows of backing plates 200 are arranged at the foremost end and the rearmost end of the evaporator, respectively. Compared with the area of the fins 100, the space occupied by the backing plates 200 is very small. After the evaporator is prepared, the effect of heat exchange of the evaporator with air will not be affected without detaching the backing plates 200. Meanwhile, two rows of backing plates are arranged at the uppermost end and the lowermost end of the evaporator, respectively. If it is necessary to detach the backing plates 200 from the evaporator, it is convenient for an operator to detach the backing plates 200 and take down the backing plates 200 from the evaporator. It should be understood that the horizontal direction refers to the front-rear direction and the longitudinal direction refers to the up-down direction.

In some embodiments of the present invention, in the step D, water having a pressure of 8 MPa is conveyed into the copper tubes 300 by the medium conveying device; and, the pressure is maintained for 60 s after the pressure in the copper tubes 300 reach the set range, so that the copper tubes 300 are expanded in outer diameter to be in interference fit with the first through holes 120. The copper tubes 300 are expanded by conveying water having a pressure of 8 MPa into the copper tubes 300. After the pressure in the copper tubes 300 reaches the set range, the pressure is maintained for a period of time. Pressure maintaining is mainly to ensure that the copper tubes 300 can be expanded fully, so that the distance between the outer wall of the copper tubes 300 and the first through holes 120 is almost zero. The fins 100 can be firmly connected to the copper tubes 300 and come into close contact with the copper tubes 300, so that the performance of the evaporator is ensured. It should be understood that the pressure maintaining refers that the pressure in the copper tubes 300 is maintained in a certain pressure range for a certain period of time. Of course, here, only optimal values are selected for the conveying pressure of water conveyed into the copper tubes 300 and the pressure maintaining time. However, in the actual production, the conveying pressure may be selected as 6 MPa, 7 MPa, 9 MPa or 10 MPa, and the pressure maintaining time may be selected as 30 s, 40 s, 80 s, 90 s or the like.

In another embodiment of the present invention, in the step B, threaded through holes are formed in the first plate 220 and the second plate 230 in an up-down direction, respectively, and the threaded through holes are in threaded connection to the fastening screws. By screwing the fastening screws in the threaded through holes, the first plate 220 and the second plate 230 are connected into a whole to serve as an auxiliary mold, and the existing fins 100 and the existing devices are used to produce an evaporator in which the distance between adjacent two fins 100 satisfies the requirements of the freezing operation, and it is unnecessary to perform mold-making and purchase new production devices, so that the production cost is greatly reduced. At the end of preparation, the fastening screws can be unscrewed, and the backing plates 200 are detached from the evaporator and used as an auxiliary mold to prepare a next evaporator.

Figure 2:
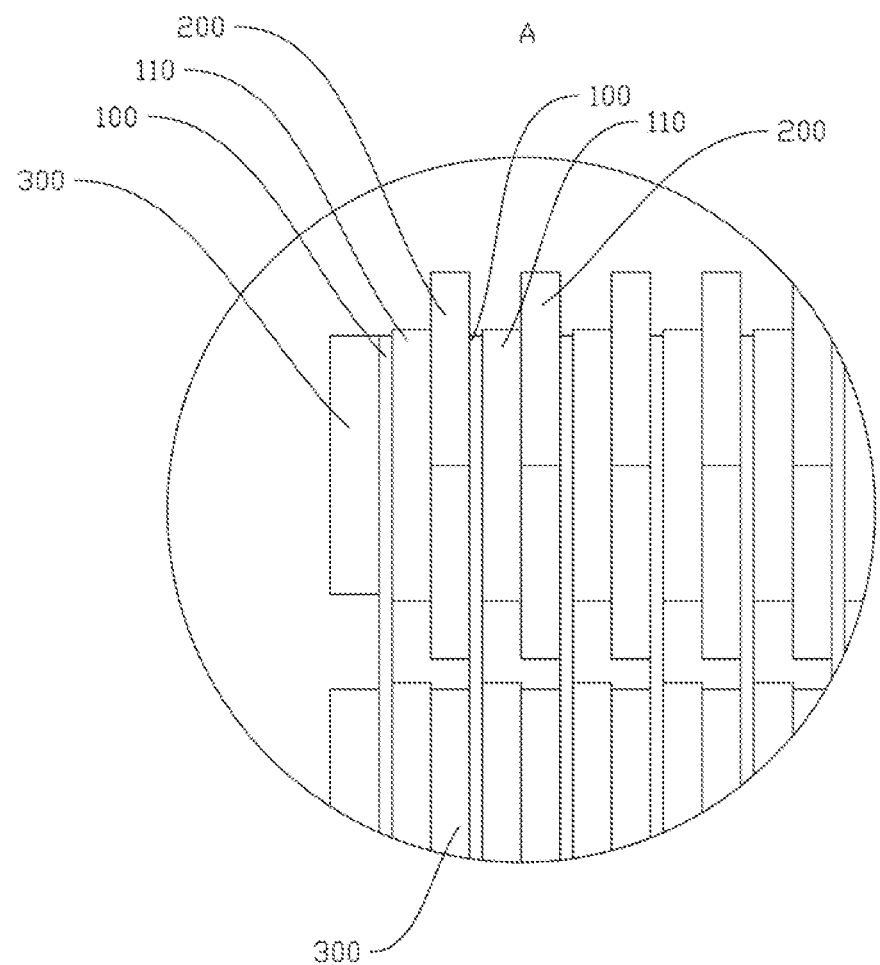
FIG. 2 is an enlarged view of part A in FIG. 1.

With reference to FIGS. 1-2, in accordance with an embodiment in a second aspect of the present invention, an evaporator is provided, which is prepared by any one of the preparation methods described above, wherein the evaporator includes multiple fins 100; multiple bumps 110 are stamped on each of the fins 100; first through holes 120 are formed on each of the fins 100 at positions corresponding to the bumps 110; copper tubes 300 pass through the first through holes 120; the copper tubes 300 are in interference fit with the first through holes 120, and the copper tubes 300 connect the multiple fins 100 into a whole; and, the distance between the bumps 110 of one of the fins 100 and an adjacent one of the fins 100 is 3 mm to 5 mm. Compared with the prior art, in the embodiment of the present invention, By making the copper tubes 300 be in interference fit with the first through holes 120, the distance between the outer diameter of the copper tubes 300 and the first through holes 120 is almost zero, and the fins 100 can be firmly connected to the copper tubes 300, so that the copper tubes 300 connect the multiple fins 100 to form the evaporator, and the performance of the evaporator is ensured. By stamping bumps 110 on each of the fins 100 and making the first through holes 120 pass through the bumps 110, the bumps 110 increase the contact area of a single fin 100 with the copper tubes 300, and the copper tubes 300 can be stably connected to the single fin 100, so that the structural stability of the evaporator is improved. Moreover, the distance between the bumps 110 on one of the fins 100 and an adjacent one of the fins 100 is set as 3 mm to 5 mm. Compared with the evaporators in the market, the distance between two adjacent fins 100 on the evaporator in the embodiments of the present invention is 3 mm to 5 mm larger than the distance between two adjacent fins 100 on the evaporators available in the market. Thus, the surface coefficient of heat transfer of the evaporator is increased, the speed of heat convection between air and the refrigerant in the evaporator is thereby quickened, the time of contact of water vapor in air and the evaporator is reduced, and the condensing capacity of water on the evaporator is reduced. Accordingly, the evaporator can still operate normally when the refrigeration temperature is below 0° C., and the requirements of the freezing operation are satisfied.

In some embodiments of the present invention, the bumps 110 each have a length of 3 mm, and the distance between the bumps 110 one of the fins 100 and an adjacent one of the fins 100 is 3 mm. In such an arrangement, the distance between two adjacent fins 100 on the evaporator is 6 mm. Compared with the existing evaporators produced in the market in which the distance between adjacent fins 100 is 3 mm, in the embodiments of the present invention, the surface coefficient of heat transfer of the evaporator is increased, the speed of heat convection between air and the refrigerant in the evaporator is thereby quickened, the time of contact of water vapor in air and the evaporator is reduced, and the condensing capacity of water on the evaporator is reduced. Accordingly, the evaporator can still operate normally when the refrigeration temperature is below 0° C., and the requirements of the freezing operation are satisfied.

The foregoing description merely shows the preferred embodiments of the present invention and is not intended to limit the present invention. Various alterations and variations can be made to the present invention by those skilled in the art. Any modifications, equivalent replacements and improvements made without departing from the spirit and principle of the present invention shall fall into the protection scope of the present invention.

I claim:

1. A method for preparing an evaporator for reducing water condensing capacity, comprising steps of:

step A: selecting fins: selecting a corresponding number of fins based on a performance need of a known size of the evaporator, stamping multiple bumps on each of the fins, and forming first through holes in the bumps;

step B: stacking: aligning and successively stacking the corresponding number of fins, with a detachable backing plate provided between every two adjacent fins, making one surface of the backing plate abut against a bump and another surface of the backing plate abut against a surface of a fin that facing away from the bump, and forming second through holes on the backing plates at positions corresponding to the first through holes;

step C: arranging tubes: selecting copper tubes same in number as the number of the first through holes on a single fin, and making the copper tubes pass through the first through holes and the second through holes to pass through the fins; and step D: expanding tubes: sealing one end of each of the copper tubes, conveying a liquid medium having a pressure of 6 to 10 MPa into the copper tube from the other end of the copper tube by a medium conveying device, and maintaining the pressure for 20 to 100 s after the pressure in the copper tubes reaches a set range, so that the copper tubes are expanded in outer diameter to be in interference fit with the first through holes.

2. The method for preparing an evaporator for reducing water condensing capacity according to claim 1, wherein, in the step B, each of the backing plates comprises a first plate and a second plate which are separately arranged; a first semicircular groove is formed in the first plate, and a second semicircular groove is formed on the second plate at a position corresponding to the first semicircular groove; and, during mounting, the first semicircular groove and the second semicircular groove form the second through hole.

3. The method for preparing an evaporator for reducing water condensing capacity according to claim 2, wherein, in the step B, a buckling column is convexly provided on an upper sidewall of the first plate, and a buckling recess matched with the buckling column is provided on a lower sidewall of the second plate.

4. The method for preparing an evaporator for reducing water condensing capacity according to claim 3, wherein, in the step B, an inclined elastic member is arranged on a sidewall of an upper end of the buckling column; an end of the elastic member is connected to an outer sidewall of the buckling column; a suspended end of the elastic member is arranged away from the outer sidewall of the buckling column; the buckling recess is formed as a T-shaped groove; an end of the T-shaped groove away from the buckling column is a large-diameter groove, while the other end thereof is a small-diameter groove; and, during mounting, an end portion of the suspended end abuts against the wall of the large-diameter groove.

5. The method for preparing an evaporator for reducing water condensing capacity according to claim 4, wherein, in the step B, the small-diameter groove has an opening at its lower end which is formed as an arc-shaped opening, so that the buckling column is embedded and clamped in the buckling recess at any angle.

6. The method for preparing an evaporator for reducing water condensing capacity according to claim 2, wherein, in the step B, threaded through holes are formed in the first plate and the second plate in an up-down direction, respectively, and the threaded through holes are in threaded connection to fastening screws.

7. The method for preparing an evaporator for reducing water condensing capacity according to claim 1, wherein, in the step B, the multiple bumps are convexly arranged on an end face of each of the fins in a five-horizontal and four-vertical manner; two backing plates are arranged between two adjacent fins, with one of the backing plates abutting against the bumps in a same row at the uppermost end of each of the fins, and the other one of the backing plates abutting against the bumps in a same row at the lowermost end of each of the fins; and, four second through holes are formed in each of the backing plates in a front-rear direction.

8. The method for preparing an evaporator for reducing water condensing capacity according to claim 1, wherein, in the step D, water having a pressure of 8 MPa is conveyed into the copper tubes by the medium conveying device; and, the pressure is maintained for 60 s after the pressure in the copper tubes reaches the set range, so that the copper tubes are expanded in outer diameter to be in interference fit with the first through holes.

* * * * *